United States Patent [19]

Keech et al.

[11] 4,149,557
[45] Apr. 17, 1979

[54] INVERTED BUCKET STEAM TRAP

[75] Inventors: David A. Keech; Ronald D. Schlesch, both of Three Rivers; Robert F. Lyons, Centreville, all of Mich.

[73] Assignee: Armstrong Machine Works, Three Rivers, Mich.

[21] Appl. No.: 831,078

[22] Filed: Sep. 6, 1977

[51] Int. Cl.² ............................................. F16T 1/30
[52] U.S. Cl. .................................... 137/185; 137/401
[58] Field of Search ............... 137/185, 186, 202, 192, 137/401

[56] References Cited

U.S. PATENT DOCUMENTS

| | | | |
|---|---|---|---|
| 2,677,387 | 5/1954 | Crawford | 137/202 |
| 3,892,256 | 7/1975 | Schlesch | 137/185 |
| 3,933,449 | 1/1976 | Miselem | 137/185 |

Primary Examiner—Alan Cohan

Attorney, Agent, or Firm—Blanchard, Flynn, Thiel, Boutell & Tanis

[57] ABSTRACT

An inverted bucket-type steam trap has a completely sealed casing of uniform wall thickness and preferably made of stainless steel. The casing is comprised of an upper part and a lower part. The lower part and the upper part both have a cylindrical wall portion which is open at one end and closed at the other end by a spherical segment-shaped bottom wall. The upper part and the lower part are affixed to each other by welding. The upper part has sidewardly extending outlet and inlet fitting means welded thereto. A valve is provided in association with the outlet fitting means. An inverted bucket is movable vertically inside the casing in response to the presence of condensate therein to operate the valve between opened and closed positions. An inlet tube is provided inside the casing and it extends from the inlet fitting means into the lower end of the bucket.

8 Claims, 6 Drawing Figures

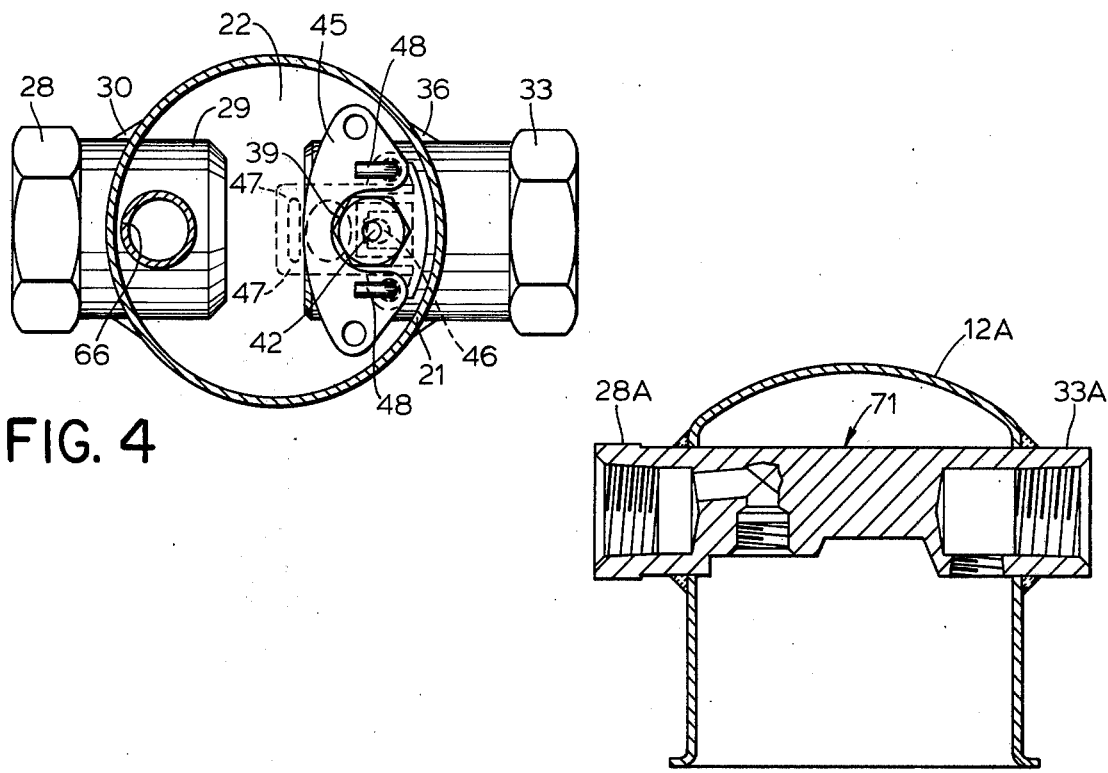
FIG. 4
FIG. 6
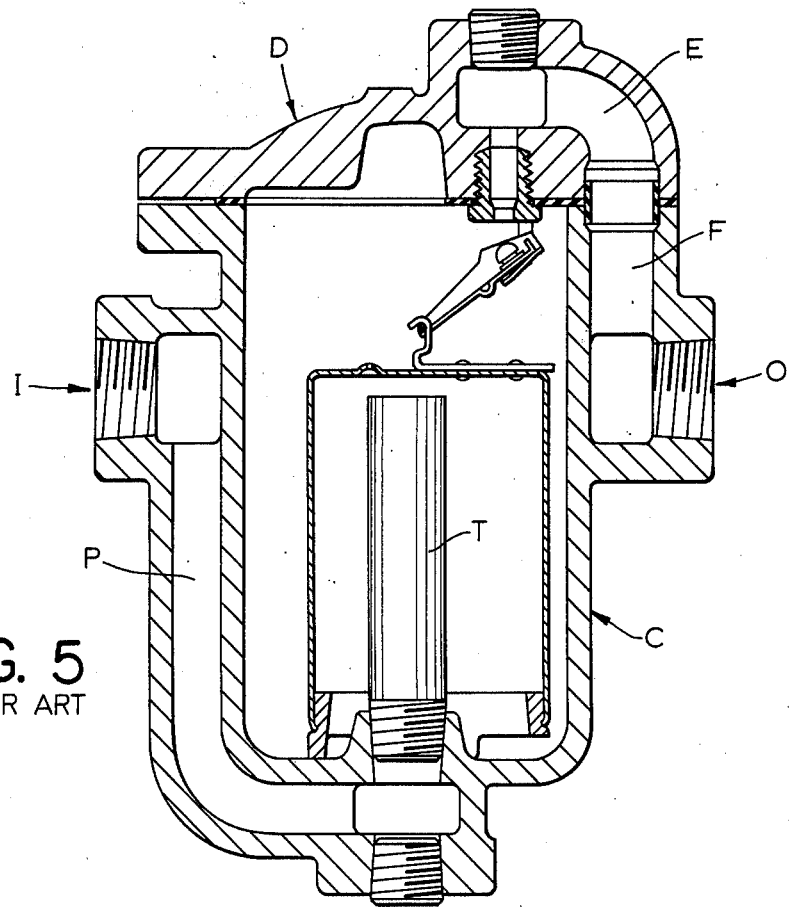
FIG. 5
PRIOR ART

INVERTED BUCKET STEAM TRAP

BACKGROUND OF THE INVENTION

This invention relates to an improved inverted bucket-type steam trap and, more particularly, relates to an inverted bucket-type steam trap made of stainless steel, having a sealed tamper-proof construction and having a side inlet and a side outlet adjacent the upper end thereof.

DESCRIPTION OF THE PRIOR ART

It is well known to use steam traps in order to trap or retain steam in a device or system, while permitting condensate to be removed. One specific type of steam trap is the inverted bucket-type steam trap which has been extensively utilized for controlling the flow of condensate from a steam heated unit to a condensate return line. Such traps are generally utilized to permit disposal of the condensate while at the same time minimizing loss of live steam from the steam heated unit.

Further, known inverted bucket-type steam traps are rather large and heavy and they are subject to corrosion. It is desired to reduce the size and weight thereof and to increase the corrosion resistance thereof, while retaining the known advantages of the inverted bucket operating principle. However, efforts to reduce the weight of these traps also reduced the strength thereof so that they could not withstand high steam pressures.

It is known to provide the inlet and outlet fittings for an inverted bucket steam trap in the side wall of the trap adjacent the upper end thereof. A typical prior art inverted bucket steam trap having a side inlet and a side outlet is shown in FIG. 5. The casing C has an inlet I and an outlet O. The casing C is a casting provided with a passage P connecting the inlet I to the tube T. The top D has a passage E connected to another passage F in the casing C which in turn communicates with the outlet O.

U.S. Pat. No. 3,892,256 discloses an inverted bucket-type steam trap in which the casing is made of two cup-shaped sheet metal parts which are joined together to form a cylindrical casing having dome-shaped ends. The inlet extends through the lower end of the casing and the outlet extends through the upper end of the casing, that is, the trap has a bottom inlet and a top outlet. The trap of U.S. Pat. No. 3,892,256 is highly satisfactory, but there are certain types of applications for which side inlet and outlet piping connections are desired. The present invention is intended to meet this need.

Accordingly, it is an object of this invention to provide an improved inverted bucket-type steam trap of smaller size and lighter weight than prior art steam traps of equivalent condensate handling capacity and which has a side inlet and a side outlet.

Another object of this invention is to provide an improved inverted bucket-type steam trap, as aforesaid, in which an inlet tube is provided within the casing and extends from the inlet fitting into the lower end of the inverted bucket and the inverted bucket has a recess in its sidewall for receiving the tube so that the overall width of the trap is minimized, vertical movement of the inverted bucket is guided by the tube so as to restrict swinging of the bucket and the tube is heated by contact with the fluid within the trap whereby to minimize condensation therein.

A further object of the invention is to provide an improved inverted bucket-type steam trap, as aforesaid, in which, like the trap of U.S. Pat. No. 3,892,256, the casing can be made primarily of stainless steel sheet so that it can be fabricated by relatively simple and inexpensive drawing operations and so that it wll possess improved corrosion resistance and sufficient strength for handling high pressure, high temperature steam.

It is a further object of this invention to provide an improved sealed stainless steel inverted bucket-type steam trap which is tamper-proof, like the trap of U.S. Pat. No. 3,892,256.

Other objects and purposes of this invention will become apparent to persons acquainted with steam traps of this general type upon reading the following specification and inspecting the accompanying drawings, in which:

FIG. 4 is a view taken along line IV—IV of FIG. 2;

FIG. 5 is a vertical longitudinal sectional view of a prior art inverted bucket steam trap having a side inlet and side outlet; and FIG. 6 is a central vertical longitudinal sectional view of a modified upper casing section having a one-piece member defining inlet and outlet fittings, according to the invention.

SUMMARY OF THE INVENTION

Figure 1:
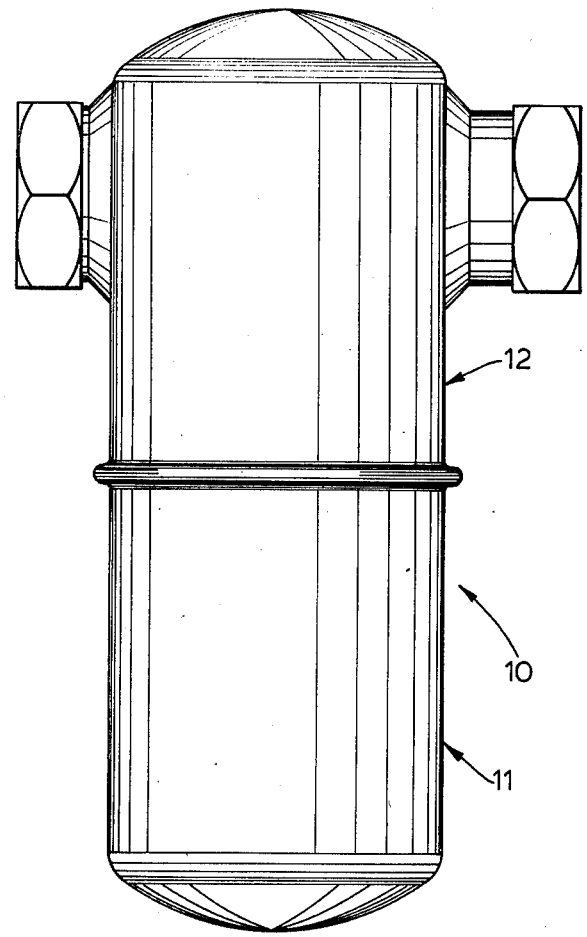
FIG. 1 is a front view of the steam trap embodying the invention.

In general, the objects and purposes of the invention are met by providing, in an inverted bucket-type steam trap, a lower stainless steel cylindrical cuplike casing section having an open top and a spherical segment-shaped bottom wall and an upper stainless steel cylindrical inverted cuplike casing section having an open bottom and a spherical segment-shaped top wall. The opposing open ends of the upper and lower casing sections are secured together to define a sealed water-tight hollow casing. The upper casing section has a one piece or a two piece structure defining a sidewardly extending inlet fitting and a sidewardly extending outlet fitting, which fittings are diametrically aligned with each other and extend from opposite sides of said upper casing section, preferably in substantially the same horizontal plane. A valve seat is provided on the inner end of said outlet fitting. A valve member is movably mounted on the outlet fitting for movement toward and away from the valve seat. An operating lever assembly is coupled to the valve member and is responsive to vertically applied forces to effect movement of the valve member between opened and closed positions. An inverted, vertically movable, bucket having a specially shaped vertical side wall, a top wall and an open bottom wall is vertically movably disposed inside the casing. The inverted bucket has a small vent opening in the top wall thereof. The top wall of the bucket also has a connector which is coupled to the operating lever assembly so that vertical movement of the inverted bucket in the casing will effect corresponding vertical movement of the operating lever assembly and an opening and closing of the valve member in response thereto. A substantially J-shaped inlet tube is disposed within the casing. The upper end of the tube is connected to the inlet fitting for receiving steam and condensate therefrom. The lower end of the tube extends upwardly into the lower end of the bucket. The side wall of the bucket has a concave recess for receiving the vertical leg of the tube.

DESCRIPTION OF A PREFERRED EMBODIMENT

The steam trap 10 illustrated in the drawing has an exterior casing comprised of a lower casing section 11 and an upper casing section 12, both made of sheet stock of substantially uniform thickness. The lower casing section 11 has a cylindrical wall 14 which is open at its upper end and which is closed at its lower end by a spherical segment-shaped bottom wall 16. The center point of the radius of curvature of the spherical segment-shaped bottom wall 16 lies on the longitudinal axis of the section 11. The upper edge portion of the wall 14 is flared radially outwardly to define a radial flange 17.

The shaping of the lower casing section 11 is accomplished by drawing a flat sheet to form the wall 14 into the cylindrical shape illustrated. The wall thickness is substantially uniform throughout the entire extent of casing section 11 and said casing section is free of any sharp corners or crevices in which dirt and other types of contaminants could collect. For example, the radius at 18 between the cylindrical wall 14 and the spherical segment-shaped wall 16 is sufficiently great to prevent the collection of dirt and the like thereat. This construction also facilitates the forming of the casing section 11.

The upper casing section 12 is also made from a sheet having a substantially uniform wall thickness throughout. This is achieved by drawing a sheet to form a cylindrical wall 21 which is open at its bottom and which is closed at its top by a spherical segment-shaped top wall 22. The center point of the radius of the spherical segment lies on the longitudinal axis of the upper casing section 12. The cylindrical wall 21 and the spherical segment-shaped top wall 22 are joined by a smoothly curved radius portion 23. The accumulation of dirt and other contaminants in the upper casing section is essentially eliminated. This construction also facilitates the forming of casing section 12. The lower edge portion of the wall 21 is flared radially outwardly to define a flange 24 having a peripheral diameter generally equal to the peripheral diameter of the radially extending flange 17 on the lower casing section 11. The flange 18 and 24 are secured together, as by a stainless steel weld, thereby to form a completely sealed and tamper-proof steam trap.

A pair of diametrically aligned circular openings 26 and 27 are provided in the cylindrical wall 21 adjacent the upper end thereof. A stainless steel inlet fitting 28 extends through the opening 26 and is secured to the wall 21, such as by a stainless steel weld 30. The inlet fitting 28 has a tubular extension 29 extending into the casing. The extension 29 has a closed inner end and a downward opening 31. The inlet fitting 28 has an internal thread 32 so that it can be connected to a line carrying steam and condensate. An outlet fitting 33 extends through the opening 27. The outlet fitting 33 has an internal pipe thread 34 in the outer portion thereof so that a condensate header line can be connected thereto. The outlet fitting 33 is secured as by a stainless steel weld 36 to the side wall 21. A downwardly opening threaded recess 37 is provided in the inner end of the outlet fitting 33 and opens into the interior of the upper casing section 12. A passageway 38 extends between the internal pipe thread portion 34 and the threaded recessed portion 37. A hollow externally threaded plug 39 is threadedly received into the threaded recess 37. The plug 39 has a passageway 41 through the central portion thereof communicating between the interior of the upper casing section 12 and the passageway 38. The lower edge of the passageway 41 defines a valve seat 42.

A valve member 46 is secured to an operating lever assembly 47. The operating lever assembly 47 is pivotally mounted on a pair of L-shaped pins 48 which are attached to a plate 45 secured to the fitting 33 so that said assembly is capable of pivoting about a horizontal axis. Pivotal movement of the lever assembly 47 about the horizontal pivot defined by pins 48 will move the valve member 46 into and out of sealing relationship with the valve seat 42 defined by the lower edge of the passageway 41 in the plug 39.

An inverted bucket 53 is disposed inside the casing. Preferably the bucket is shaped by drawing a sheet of substantially uniform thickness so as to form a vertical wall 54, which is open at its bottom and closed at its top by a top wall 56. In this particular embodiment, the top wall 56 is flat. A small opening 57 is provided in the top wall 56 offset from the center thereof to permit escape of gas from the upper end of the bucket at a slow controlled rate in a known manner. The bottom edge of the inverted bucket is flared radially inwardly at 58 to define a lip 59. The radius of the flare 58 is quite large to minimize collection of dirt and the like thereat.

A connector 61 is secured, as by a pair of welds 62, to the upper surface of the top wall 56. The connector 61 has an upwardly extending extension portion 65 close to the common central axis of both the upper and lower casing sections, 12 and 11, respectively, and is bent to define a hook 63 at the upper end thereof. The hook 63 extends through a slot in the lever assembly 47.

An important feature of the invention is that the vertical wall 54 is formed to provide a concavo-convex portion, whose outer concave side defines a recess 55 which is preferably substantially U-shaped in cross-section. The recess extends continuously from the top to the bottom of the inverted bucket 53, for purposes to be described below. The lower edge 60 of the wall 54 in the recess 55 is straight.

The inverted bucket 53 has sufficient weight to pull the operating lever assembly 47 downwardly and, consequently, pull the valve member 46 away from the valve seat 42 when an insufficient amount of steam has been collected inside the inverted bucket and it is required that condensate be removed from the trap 10. However, when a sufficient quantity of steam collects in the upper end of the bucket 53 to impart buoyance thereto, the bucket will rise and will close the valve member 46 against the seat.

A substantially J-shaped inlet tube 66 is disposed entirely within the casing 10. The upper end of the inlet tube 66 is secured in the opening 31 in the inlet fitting 28. The lower end of the inlet tube 66 extends upwardly into the lower end of the inverted bucket 53. The upright leg 67 of the inlet tube 66 is partially received in the recess 55 and extends lengthwise therein. The reversely curved portion 68 of the inlet tube 66 extends under the lower edge 60 of the recess 55 so that the inverted bucket 53 is supported thereon in the lowermost position of the bucket.

The structure of inlet tube 66 and the inverted bucket 53 provides a number of important construction and operational advantages. Because the inlet tube 66 is totally enclosed within the casing, it is contacted by heated fluid therein so that formation of condensate in the tube is minimized. It is not necessary to increase the diameter of the casing, in comparison with the structure of U.S. Pat. No. 3,892,256, for an equivalent condensate handling capacity. Moreover, the vertical movement of the inverted bucket 53 is guided by the inlet tube 66, whereby swinging of the bucket inside the casing is essentially eliminated. This greatly improves the durability of the trap and minimizes erroneous operation of the valve mechanism.

MODIFICATION

Figure 2:
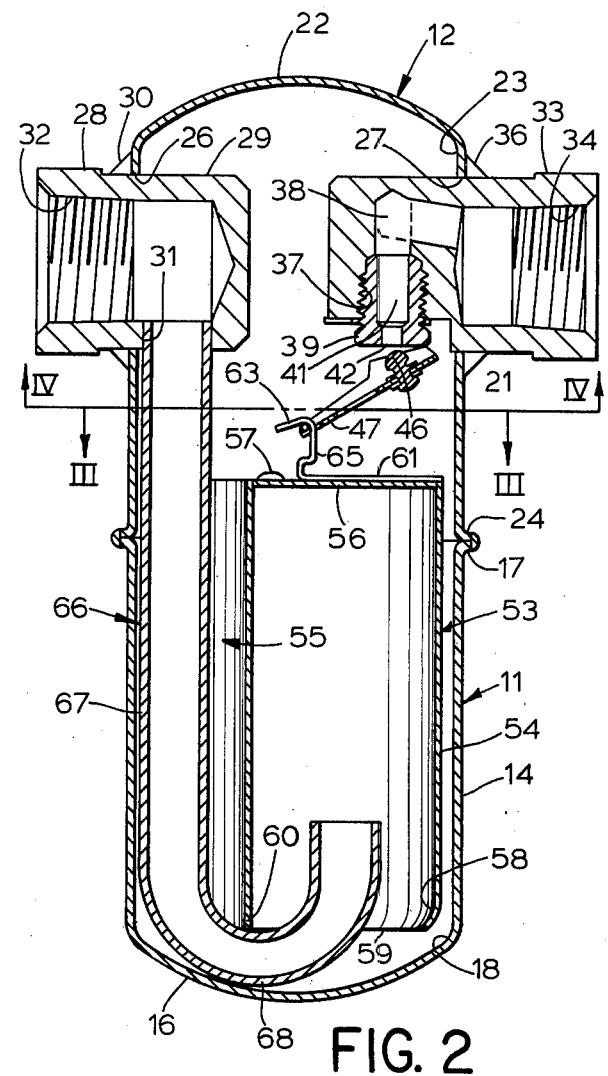
FIG. 2 is a central vertical longitudinal sectional view of the steam trap.
Figure 3:
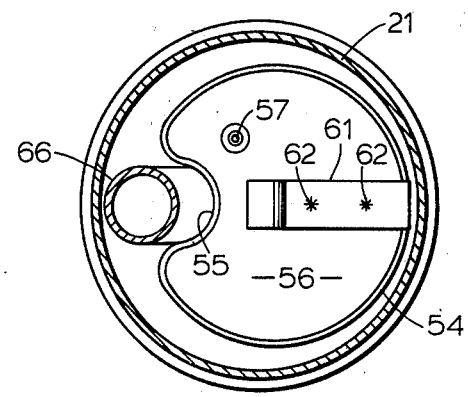
FIG. 3 is a sectional view taken along line III—III in FIG. 2.

In FIG. 6, there is illustrated a modified construction of the inlet and outlet fitting means. The same reference numerals are used in FIG. 6 as in FIGS. 1 to 5, with the suffix "A" added thereto. In this embodiment, the inlet and outlet fittings are defined by a one-piece monolithic member 71, preferably made of stainless steel, which provides both the inlet fitting 28A and outlet fitting 33A. The use of the one-piece member 71 minimizes alignment problems, and increases the rigidity so as to reduce the danger of weld breakage. Further, it provides a trap which is more resistant to freezing because the heat content of flash steam that forms in the condensate header is transmitted to the member 71 so that its entire mass is heated and keeps the interior of the trap hotter, in comparison with the structure of FIGS. 1 to 5. Another advantage is that a heat-insulating jacket, for example, polyurethane foam, can more easily be provided on the trap. In FIG. 6, the outlet fitting 33A is round, whereas the inlet fitting 28A has an enlarged hex head so that the outlet fitting can easily be slid through the openings 26A and 27A for assembly purposes. In all other respects the member 71 provides the same functions and effects as the separate inlet fitting 28 and outlet fitting 33 in FIGS. 1 to 5.

OPERATION

Although the operation of inverted bucket-type steam traps is well known, an abbreviated discussion thereof will be described below for convenience.

The steam trap 10 is normally installed in a drain line between the steam heated unit connected to the inlet coupling 28 and the condensate return header connected to the outlet coupling 33. When the inverted bucket 53 is in the lowermost position, as shown, the operating lever assembly 47 is in the lower position and the valve member 46 is wide open. The initial flood of condensate enters the steam trap 10 through inlet tube 66 and flows beneath the lip 59 of the inverted bucket 53 to fill the trap body and completely submerge the inverted bucket. Excess condensate is discharged through the wide open valve member 46 to the outlet coupling 33. When steam enters the steam trap 10, it collects at the top portion of the inverted bucket 53 imparting buoyancy thereto. The inverted bucket will then rise and lift the valve member 46 toward its seat at the lower end of the passageway 44. When the valve member is close to the seat, but is still spaced therefrom a small distance, the further flow of condensate through the outlet opening 44 will effect a snapping of the valve member 46 into the closed position.

When the valve member 46 is closed, any air and noncondensible dioxide gas entering the trap will pass through the vent 57 in the top wall 56 of the inverted bucket 53 and collect at the top of the steam trap in the upper body part 12. Similarly steam which reaches the upper end of the bucket will flow through the vent 57 at a slow controlled rate. This steam is eventually condensed by radiation from the steam trap. As condensate flows into the trap through the fitting 28, when the condensate level in the steam trap reaches a level which is slightly above the floating level for the inverted bucket 53, the inverted bucket will exert a slight pull downwardly on the operating lever assembly 47. However, the valve member 46 will not be moved to the open position until the condensate level rises to a predefined opening line in the unit for the existing pressure differential between the steam and the pressure in the outlet coupling 33 or condensate return header. When the condensate reaches this level, the weight of the inverted bucket multiplied by the leverage achieved by the length of the operating lever arm assembly 47 exceeds the pressure holding the valve 46 into its sealing engagement with the valve seat 42. The inverted bucket 53 will then sink and open the valve member 46.

The smoothly curved surfaces of the trap are flushed clean by the condensate passing through the system. That is, condensate entering the steam trap 10 through the inlet coupling 28 will travel into the interior of the inverted bucket 33 and out through the open bottom wall thereof past the flare 58 and lip 59. Any dirt accumulated on the lip 59 will be flushed into the lower casing section 11. Similarly, the radius 18 provided between the spherical segment-shaped bottom wall 16 and the cylindrical wall 14 will minimize the collection of dirt and the like thereat because the flow of condensate will move these contaminants up into the upper part of the steam trap 10 and eventually out through the outlet coupling 33.

The thin wall construction of the upper and lower casing sections, in combination with the spherical segment-shaped upper and lower end walls provides a relatively small size and lightweight construction, which is capable of withstanding high pressure, high temperature and which can handle large volumes of condensate for its size. The spherical segment-shaped upper and lower end walls 16 and 22 of the unit facilitate an even distribution of the pressure over the ends so as to prevent deformation thereof.

It is preferred to make the trap entirely of stainless steel because of the high corrosion resistance, ease of processing and high strength of the material. Austenitic stainless steels having a composition of:

C—up to 0.08% (maximum), preferably less than 0.03%
Mn—up to 2.0% (maximum)
Si—up to 1.0% (maximum)
Cr—16–22%
Ni—8–12%
P—up to 0.045% (maximum)
S—up to 0.030% (maximum)
Fe—balance are preferred. An especially advantageous austentinic stainless steel is AISI No. 304L, having a composition of:

C—up to 0.03% (maximum)
Mn—up to 2.0% (maximum)
Si—up to 1.0% (maximum)
Cr—18–20%
Ni—8–12%
P—up to 0.045% (maximum)
S—up to 0.030% (maximum)
Fe—balance It has been found that this latter material is especially resistant to corrosion under the service conditions of steam traps.

The various parts of the trap can be fabricated by conventional techniques, such as drawing and machining, in accordance with known procedures.

The steam trap subassemblies, i.e. the lower casing section 11 and the upper casing section 12 including the fittings 28 and 31, or the member 71, are treated to remove residual stresses therein. In one satisfactory procedure the subassemblies are annealed in a vacuum at 1950° F., then cooled in an inert gas atmosphere and particularly quickly cooled through the critical zone to end up with subassemblies that are free from stresses. The inert gas atmosphere utilized in the cooling process is for the purpose of maintaining the stainless steel exterior of the product bright and shiny. The internal working parts of the trap are then assembled and the parts are secured together by welding the casing sections to each other, as shown, whereby to form the sealed trap assembly.

Although the preferred embodiment of the invention illustrated in the drawings employs flanges 17 and 24 on the mating ends of the sections 11 and 12, the invention also contemplates a modification in which such flanges are not provided and the casing sections 11 and 12 are secured together by butt welding. In another modification, the adjacent end portions of the casing sections 11 and 12 are sized so as to snugly slideably interfit and they are secured together by an overlap weld.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An inverted bucket steam trap, comprising:
   a casing defined by upper and lower cylindrical cup-like casing sections of uniform wall thickness which casing sections are joined together to form a completely sealed water-tight chamber having a cylindrical side wall and closed top and bottom walls;
   means defining a sidewardly extending inlet fitting and a sidewardly extending outlet fitting mounted on said cylindrical side wall adjacent the upper end thereof, said outlet fitting having a valve seat thereon inside said chamber;
   a valve member movably disposed in said chamber and adapted to be moved into and out of sealing engagement with said valve seat;
   operating lever means disposed in said chamber and responsive to vertically applied force to effect movement of said valve member toward and away from said valve seat;
   a vertically movable inverted bucket disposed in said chamber and having a vertical side wall which is open at its bottom and has a wall at its top and a connection from the top wall of the bucket to said operating lever means whereby vertical movement of said inverted bucket in said chamber will effect movement of said operating lever means thereby to open or close said valve member, said inverted bucket having an elongated outwardly opening recess in the side wall thereof and extending from the top to the bottom thereof; and
   an inlet tube disposed within said chamber and connected at its upper end to said inlet fitting for receiving steam and condensate therefrom, the lower end of said inlet tube extending upwardly into said inverted bucket, said inlet tube being substantially J-shaped and having an upright upper portion received in and extending along said recess and a reversely curved lower portion underlying the lower edge of said bucket and thence extending upwardly into said bucket.

2. An inverted bucket steam trap as claimed in claim 1, in which said bucket is made of sheet material and said recess is defined by a concavo-convex portion whose concavity defines a substantially U-shaped recess.

3. An inverted bucket steam trap as claimed in claim 2, in which said inlet and outlet fittings are diametrically aligned with each other and extend from diametrically opposite sides of said casing side wall in substantially the same horizontal plane.

4. An inverted bucket steam trap as claimed in claim 3, in which both said casing sections are made of annealed drawn stainless steel sheets.

5. An inverted bucket steam trap as claimed in claim 3, in which said inlet fitting and said outlet fitting are defined by separate members which are welded to said casing side wall and whose inner ends are spaced from each other.

6. An inverted bucket steam trap as claimed in claim 3, in which said inlet fitting and said outlet fitting are defined by a one-piece member which extends substantially diametrically through said casing and is welded thereto adjacent its ends.

7. An inverted bucket steam trap, comprising:
   a casing having a cylindrical side wall and closed top and bottom walls defining a water-tight chamber;
   means defining a sidewardly extending inlet fitting and a sidewardly extending outlet fitting mounted on said cylindrical side wall adjacent the upper end thereof, said outlet fitting having a valve seat thereon inside said chamber;
   a valve member movably disposed in said chamber and adapted to be moved into and out of sealing engagement with said valve seat;
   operating lever means disposed in said chamber and responsive to vertically applied force to effect movement of said valve member toward and away from said valve seat;
   a vertically movable inverted bucket disposed in said chamber and having a vertical side wall which is open at its bottom and has a wall at its top and a connection from the top wall of the bucket to said operating lever means whereby vertical movement of said inverted bucket in said chamber will effect movement of said operating lever means thereby to open or close said valve member, said inverted bucket having an elongated outwardly opening recess in the side wall thereof and extending from the top to the bottom thereof; and
   an inlet tube disposed within said chamber and connected at its upper end to said inlet fitting for receiving steam and condensate therefrom, the lower end of said inlet tube extending upwardly into said inverted bucket, said inlet tube being substantially J-shaped and having an upright upper portion received in and extending along said recess and a reversely curved lower portion underlying the lower edge of said bucket and thence extending upwardly into said bucket.

8. An inverted bucket steam trap, comprising:

a casing having a cylindrical side wall and closed top and bottom walls defining a water-tight chamber;

means defining a sidewardly extending inlet fitting and a sidewardly extending outlet fitting mounted on said cylindrical side wall adjacent the upper end thereof, said fittings extending from diametrically opposite sides of said casing side wall in substantially the same horizontal plane, said fittings having internally threaded recesses located outside said casing and having passages extending from the inner ends of said recesses into the interior of said casing, said inlet fitting having a downwardly extending opening communicating with the inner end of its passage and inside said chamber, said outlet fitting having a downwardly opening valve seat thereon inside said chamber and communicating with its passage;

a valve member movably disposed in said chamber and adapted to be moved into and out of sealing engagement with said valve seat;

operating lever means disposed in said chamber and responsive to vertically applied force to effect movement of said valve member toward and away from said valve seat;

a vertically movable inverted bucket disposed in said chamber and having a vertical side wall which is open at its bottom and has a wall at its top and a connection from the top wall of the bucket to said operating lever means whereby vertical movement of said inverted bucket in said chamber will effect movement of said operating lever means thereby to open or close said valve member; and an inlet tube disposed within said chamber and having its upper end extending into said downwardly extending opening of said inlet fitting for receiving steam and condensate therefrom, the lower end of said inlet tube extending upwardly into said inverted bucket.

* * * * *